Dec. 12, 1972    D. W. SICKELS    3,705,843
METHOD FOR ELECTROCHEMICAL DEBURRING
Filed July 27, 1970    2 Sheets-Sheet 1
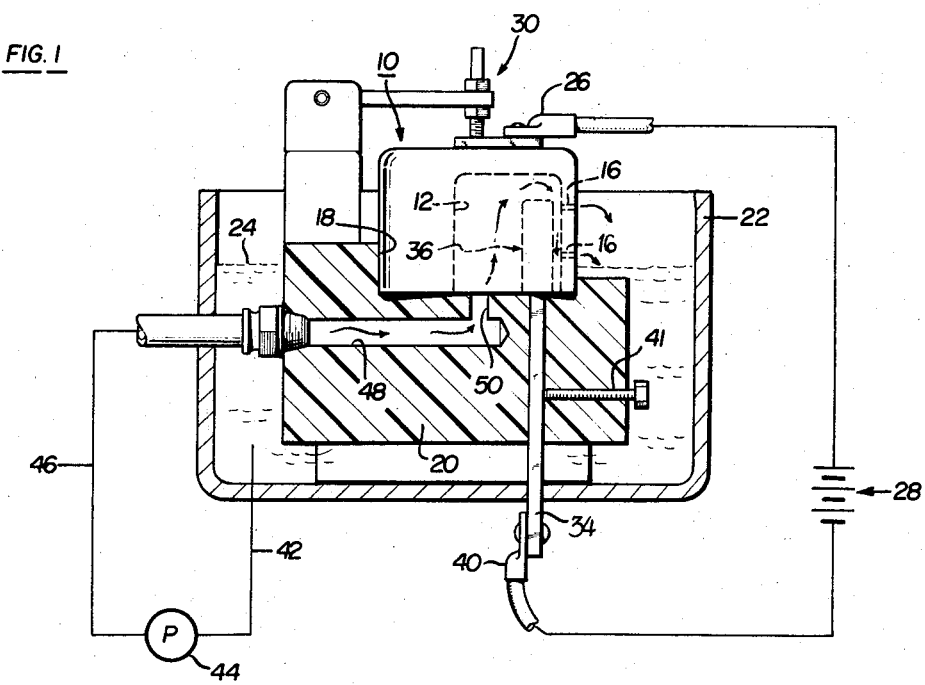
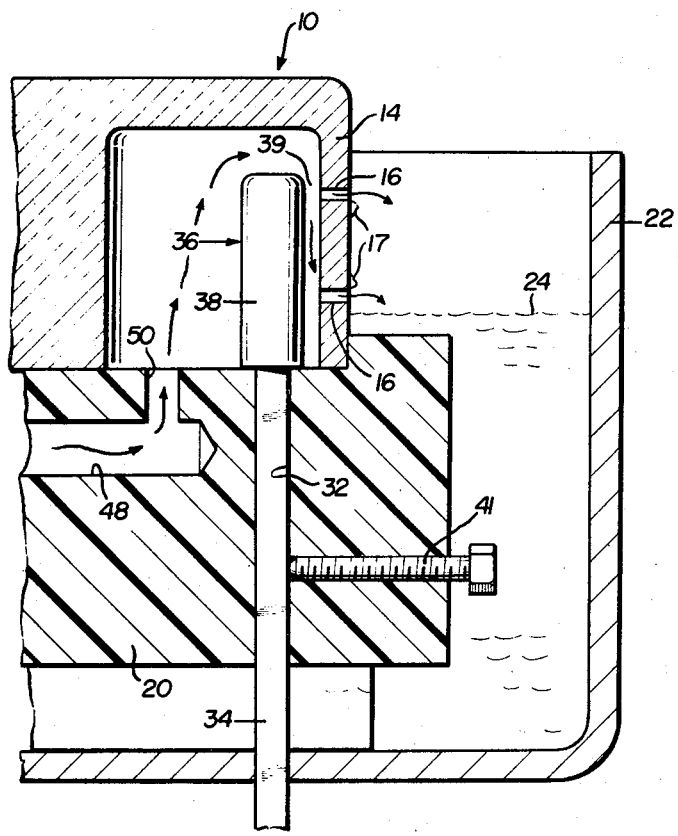
INVENTOR.
DAVID W. SICKELS.
BY
CULLEN, SETTLE, SLOMAN & CANTOR.
ATT'YS.

United States Patent Office 3,705,843
Patented Dec. 12, 1972

3,705,843
METHOD FOR ELECTROCHEMICAL DEBURRING
David W. Sickels, Plymouth, Mich., assignor to
Electrogenics, Inc., Wayne County, Mich.
Filed July 27, 1970, Ser. No. 58,399
Int. Cl. B23p 1/00
U.S. Cl. 204—129.5                    6 Claims

ABSTRACT OF THE DISCLOSURE

A method and apparatus to electro-chemically machine apertures of a work piece which may be a cup-like structure such as the cover of a carburetor or the like. The apertures may (1) open to the atmosphere or (2) intersect with other apertures of greater combined size or (3) have portions of increased diameter. When electrolyte under pressure is introduced between the negative electrode positioned adjacent the aperture of the work piece and the positively charged work piece, due to the increased area beyond the aperture, the flow of the electrolyte under pressure causes turbulence or temporary eddy currents from a first laminar flow of the electrolyte through the aperture to either the unrestricted flow to the atmosphere or to a second laminar flow of the electrolyte through the increased diameter portion of the aperture, due to the reduced pressure. The resultant turbulence efficiently scrubs the anodic film and effectively removes burrs around the edges of the exit end of the aperture with minimal stock removal along the wall of the apertures.

BACKGROUND OF THE INVENTION

This invention relates to an apparatus and method for electro-chemically deburring metallic parts of various shape.

Electro-chemical machining of metallic parts has become of increased importance in the metal working field. The technique is used to cut and shape metal parts, as well as to deburr them. It is particularly suitable for use with small stamped or machined parts of complicated design where it is difficult, if not impossible, to remove the burrs left by the stamping or machining operations. In electro-chemical deburring metal removal is accomplished by means of electrolytes. Conventionally, a direct current is applied between two pieces of a metal part submerged within or subjected to the flow of a suitable electrolyte. The work piece from which removal of metal is desired is made the anode and an electrode is supplied which is made the cathode. The apparatus is especially designed to function best with a specific work piece being operated upon. The electrolyte is continuously circulated and is made to flow sufficiently fast so that it carries the metal given off from the anode with it and hydrogen gas is generated at the cathode.

The most commonly used electrolyte is a water solution of sodium chloride although other electrolytes could be used.

When direct current is applied between the electrode and the work piece it flows between the anode metal work piece and the cathode along the path of least resistance, i.e., the high points on the work piece. The metal is removed by anodic deplating. Since more metal is removed at points of greatest current flow the high points on the work piece will be removed first, thus, smoothing out or deburring the work piece. At the finish, there is substantially equal current density at all points.

Because each work piece to be machined or deburred has in general a unique shape, and because apparatuses designed to be used with work pieces of one particular shape cannot be used efficiently or accurately with work pieces of another shape, new apparatus for use in conjunction with each distinctly shaped work piece must be designed.

SUMMARY OF THE INVENTION

The electrical-chemical machining apparatus of the present invention is contemplated for rapidly and efficiently deburring work pieces, and particularly apertures of work pieces communicating with an interior cavity of the work piece into which the electrode extends and which is in communication with the outlet of the pressurized electrolyte.

Also contemplated is an improved electro-chemical machining apparatus which facilitates rapid loading and unloading of the work pieces so that the deburring can be carried out in a minimum amount of time.

Further contemplated is an improved electro-chemical machining apparatus and method which clamps the work pieces in such a way as to protect finished surfaces which are not to be machined by the electro-chemical machining process and additionally, in a unique way incorporates the work piece into the machining circuit.

More specifically contemplated is an improved electro-chemical machining apparatus incorporating a unique electrode structure which delivers both current and electrolyte to the areas of the work piece and particularly bores of the work piece to be deburred without concern for secondary machining effects.

Additionally, the electro-chemical machining apparatus has improved provisions for retaining and locating the work piece and the electrode rods have an improved provision for distributing the electrolyte to the surfaces of the work piece to be deburred.

An electro-chemical deburring apparatus for a work piece including a non-conductive support structure and a tool electrode mounted in the support structure for connection to the negative terminal of an electrical power source; the tool electrode comprises a support rod and a center rod extending upwardly from the support rod; the tool electrode is rigidly confined in the non-conductive support structure which has a conduit in the lower portion of it through which electrolyte under pressure is introduced to flow around the center rod of said tool electrode.

A cap like work piece having an internal cavity is rigidly mounted to the upper surface of the non-conductive support structure in such a way that the center rod of the electrode extends into the cavity of the work piece and the electrolyte conduit of the non-conductive support structure opens into the cavity of the work piece adjacent the center rod of the electrode. The work piece is electrically connected to the positive terminal of the electrical power source. The work piece has a plurality of apertures extending outwardly from the internal cavity of the work piece and the center rod of the electrode is positioned immediately adjacent the cavities and partly blocking the cavities so that the electrolyte introduced under pressure into the cavity of the work piece is forced to flow around the center rod of the electrode and out through the apertures of the work piece, as the electrolyte exits from the apertures in the work piece the suddenly increased space volume causes an eddy current to be created immediately adjacent the radial outer edges of the apertures whereby under application of direct current between the work piece and the electrode the radial edges of the apertures of the work piece are deburred.

The foregoing and other objects and advantages of the present invention will become apparent from the following detailed description in connection with the accompanying drawings.

BRIEF DESCRIPTION OF THE DRAWINGS

The accompanying drawings illustrate several forms of preferred embodiments of the present invention in which:

FIG. 1 is a schematic illustration partly shown in cross-section of the novel improved electro-chemical deburring apparatus for apertures of cover-like or cup-like work pieces;

FIG. 2 is an enlarged fractional cross-section of the embodiment shown in FIG. 1 illustrating more in detail the function of the present novel deburring apparatus;

DESCRIPTION OF THE PREFERRED EMBODIMENTS

Figure 3:
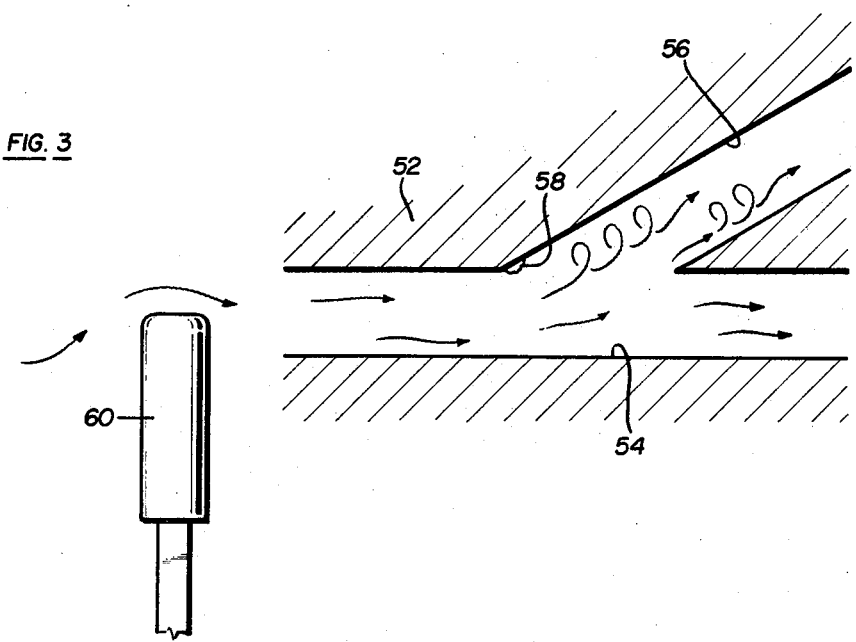
FIG. 3 is a schematic illustration of a further embodiment of the present invention.

In order that the electro-chemical apparatus of the present invention can be more completely understood, the work piece to be operated upon will be described first.

As seen in FIG. 1, the work piece 10 is a cover-like structure and, in this particular instance, may be a cover for a carburetor of a combustion engine.

The work piece 10 has a relatively large internal cavity 12 which may be circular, radial, square, hexagonal or any other shape, disposed towards one side of the work piece 10 so that there is provided a relatively thin circumferential outer wall section 14.

The outer wall section 14, in this particular construction of the work piece 10, is provided with a plurality of apertures 16 which are spaced at random and in non-regular spaced relationship radially around the outer surface wall 14 of the work piece 10.

As is common practice in the manufacturing of parts of these kinds, the apertures 16 in the relatively thin wall section 14 of the work piece 10, are provided by machining operations such as boring or drilling. Ordinarily, these operations provide a generally smooth internal bore surface between the inner and outer ends of the apertures, however, the radial edges of the inner and outer ends of the apertures are of usually rugged and shagged contour exposing surface extensions known in the field as "burrs" which have to be removed to provide a relatively smooth slightly radiused radial edge or chamfered edge around the inner or outer ends of the apertures 16.

Normally, this is difficult to accomplish by mechanical machining operations such as grinding, since these apertures may be of various diameters and thus require a plurality of grinding operations involving the employment of a variety of grinding tools of different diameters, thus, all together making a mechanical deburring operation for apertures of this particular kind of a work piece expensive and time consuming.

In the present instance, the work piece 10 which, as mentioned before, comprises a cover-like structure, is rigidly mounted within a complementary recess 18 of a stationary support structure 20 which is preferably electrically isolated by means conventionally known in the art (not shown).

The non-conductive support structure 20 is disposed within the center of a tank or the like 22 adapted to contain a supply of electrolyte fluid 24.

The electrolyte fluid as mentioned in the foregoing, may be a water soluble solution of sodium chloride or similar nitrates commonly used in electro-chemical machining processes. One of such solutions particularly suitable for the present process is described and disclosed in U.S. Pat. 3,058,895.

The work piece 10 is preferably of metal and is connected electrically by means of a contactor 26 to the positive side of a source of electrical energy 28.

The work piece 10 is clamped securely onto the non-conductive support 20 by means of an adjustable clamp mechanism indicated at 30.

As more in detail shown in FIG. 2, the non-conductive support 20 is provided with an aperture 32 adapted to retain the base shaft 34 of an electrode 36 which extends through the aperture 32 upwardly into the cavity 12 of the work piece 10 where the electrode expands in a conductive center rod portion 38.

The lower end of the shaft 34 of the electrode 36 extends through the non-conductive support 20 downwardly and outwardly of the tank 22 and is electrically connected by means of a contact 40 to the negative side of the source of electrical energy 28 as illustrated in FIG. 1.

The electrode 36 may be of any kind of a material most suitable for electro-chemical deburring operation of the work piece 10 so as to be compatible with the material of the work piece 10 to produce the most effective electrolytical machining action.

As by example, the tank 22 is filled with an electrolyte solution 24 of the kind referred to hereinbefore and is connected for communication with a return outlet 42 which is connected to the inlet of a pump 44 adapted, when actuated, to continuously circulate the electrolyte 24 in the tank 22 from the outlet 42 through pump 44, an inlet pipe 46 and through a conduit 48 provided in the non-conductive support 20 disposed within the tank 22.

The electrolyte conduit 48 in the non-conductive support 20 is in fluid communication with an outlet 50 which is disposed such in the support 20 as to open up into the cavity 12 of the work piece 10 immediately adjacent the center rod portion 38 of the electrode 36.

As mentioned previously, the apertures 16 in the work piece 10 usually have burrs 17 disposed around the inner and outer radial edges, or only on the outer radial edge, caused by the boring or drilling operation by which the apertures 16 are produced.

Referring to the example in FIGS. 1 and 2, in order to remove the burrs 17 from the radial outer edges of the apertures 16 electrolytically without removing any material from the smooth internal surfaces of the apertures 16, the improved process of the present invention is carried out as follows:

After the work piece 10 has been placed on the support 20 within the appropriate recess 18 and such that the cavity 12 of the work piece fits over the center rod 38 of the electrode 36 which is negatively connected to the source of electrical energy 28, the work piece 10 is electrically connected by means of contact 26 to the positive side of the source of electrical energy. The center rod 38 of the electrode 36 is positioned such, relative to the outer wall 14 of the work piece 10, so as to provide an average gap distance of from between .012 to .125 inch and in the particular instance illustrated and described herein, the gap distance from the inside of the center rod to the inside of the outer wall 14 of the work piece is about .030 inch and the gap distance from the inside of the center rod to the outer radial edges of the apertures 16 is about .080 inch.

The electrolytic process is initiated by starting the pump 44 which is adapted to pump electrolyte into the work piece 10 and around the center rod 38 of the electrode at a flow rate of about 2.5 gallons per minute.

The electrolyte enters the cavity 12 of the work piece 10 through the conduit 48 and inlet 50 at a pressure of about 20 to 40 p.s.i., circulates around the center rod 38 of the electrode, through the gap 39 between the electrode and the work piece and is forced to exit through the work piece apertures 16.

The flow of the electrolyte through the apertures 16 is substantially laminal, however, when the electrolyte reaches the end of the apertures, there is a sudden drop in pressure due to the change in the solid boundary which results in a turbulence around the radial outer edges of the apertures creating in effect an eddy current as illustrated in FIG. 2 by the flow lines. This turbulence results in an efficient scrubbing off of the anodic film which is formed by the electrolytic action and provides thereby a more efficient material removal around the radial edges of the apertures to thereby effectively remove the burrs 17.

Results of test experiments show that by this improved method an effective burr removal was obtained on the inner radial edges of the apertures and a substantially complete removal around the outer radial edges of the apertures. Examining the surfaces under a microscope revealed that the action did take place at the radial edge of the aperture removing all the burrs but not destroying the internal configuration of the aperture and without leaving markings on the ground outer diameter of the work piece.

Referring now to the example illustrated schematically in FIG. 3, a specific work piece is indicated at 52 provided with a straight bore aperture 54 which, within the work piece, is intersected by another aperture 56 which may intersect the aperture 54 at an angle relative to the longitudinal axis of the aperture 54.

Radially around the edges at the plane of intersection between the apertures 54 and 56, burrs 58 are left caused by the previous machining operation. The area around the intersection of the apertures 54 and 56 provided an increased area volume relative to the nominal diameter of the aperture 54.

As in the previous embodiment, the work piece 52 is clamped in stationary position and is electrically connected to the positive side of a source of electric energy. An electrode 60 is placed adjacent the entrance or inner end of the aperture 54 of the work piece 52, in a fashion similar to the arrangement in FIGS. 1 and 2, and is electrically connected to the negative side of the source of electric energy.

In operation, to remove the burrs 58 an electrolyte, indicated by the flow lines, is caused to flow over and around the top of the electrode 60 and in laminar direction through the first portion of the aperture 54. As the electrolyte reaches the area of intersection between the internal apertures 54 and 56, there will be a sudden pressure drop due to the increased volume causing a turbulence in the flow of the electrolyte as portions of the electrolyte enter the intersecting aperture 56. This turbulence, or eddy current, as indicated by the flow lines causes an efficient scrubbing action around the edges of the intersection between the apertures 54 and 56 to efficiently and effectively remove the burrs 58. Thereafter, the flow of the electrolyte through the remainder of the apertures 54 and 56 becomes again laminar. The laminar flow of the electrolyte through the apertures will not remove any material from the smooth internal portions of the apertures, the only removal of material taking place where there is a sudden drop in pressure due to an increased volume causing scrubbing action of the electrolyte by means of the turbulence created at that point.

Figure 4:
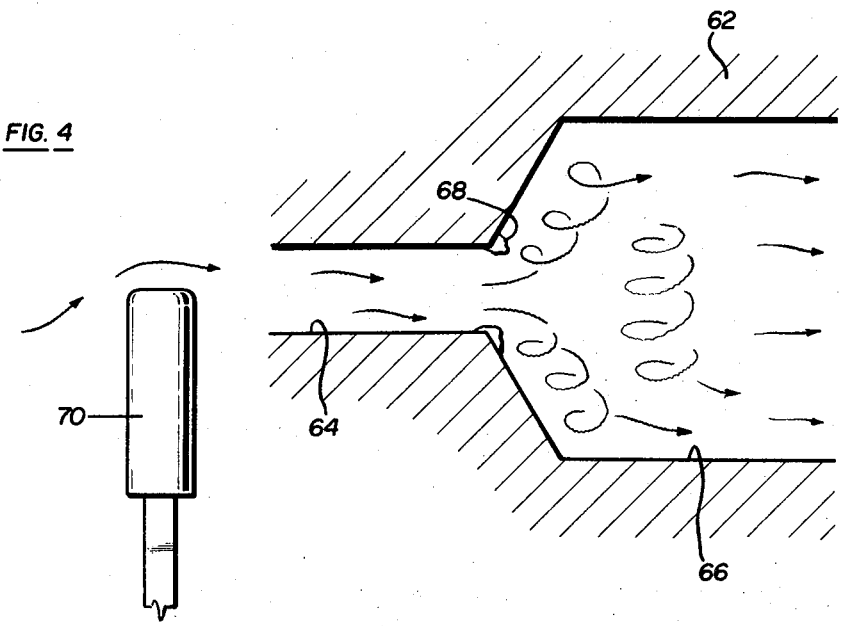
FIG. 4 is another schematic illustration of a still further embodiment of the present invention.

With reference to the exemplary embodiment schematically illustrated in FIG. 4, there is illustrated a work piece 62 provided with an aperture 64 which terminates outwardly into an enlarged counter-bore portion 66. Due to the machining operation of the counter-bore, burrs 68 are formed around the inner radial edges at the point where the bore 64 begins to expand into the counter-bore 68.

As in the previous embodiment, in order to remove the burrs 68 the work piece 62 is stationarily retained on a non-conductive support and will be connected to the positive side of a source of electric energy. An electrode 70 is then placed in front of the inner end of the aperture 64 and will be connected to the negative terminal of the source of electric energy. As indicated by the flow lines, an electrolyte is then caused to flow around the top of the electrode 70 and into the aperture 64 in laminar flow direction. As the electrolyte enters the enlarged counter-bore 66, the laminal flow of the electrolyte becomes turbulent due to a pressure drop caused by the suddenly enlarged volume. The temporary turbulence or eddy current of the electrolyte causes an effective scrubbing action around the radial edges at the intersection to effectively remove the burrs 68.

It has been found that effective results are achieved only when the flow of electrolyte through the gap between the electrode and work piece and through the apertures in the work piece becomes of a turbulent nature around the edges of the apertures to be deburred. Thus, the work piece, or the apertures, are formed such to cause a laminar flow of electrolyte through some portions of the apertures, which, preferably around the edges where the aperture becomes enlarged or opens up to the outside or intersects with another aperture within the work piece becomes turbulent to provide a scrubbing action for effective burr removal.

As mentioned before, the average flow pressure of the electrolyte is preferably between 20 to 40 p.s.i. and the temperature range of the electrolyte is preferably between 90 to 110° F.

In the present instance, the electrolizing current is preferably in the voltage range from 6 to 12 volts and the average current density is from about 80 to 50 amperes per square inch.

Although the apparatus of the present invention has been described in connection with a work piece having a particular configuration, it will be appreciated that the apparatus can be used to deburr work pieces of other configurations, the only requirement being that the apertures in the work piece, which are to be deburred, open into an enlarged area to provide for the creation of a turbulent flow of electrolyte around the edges of the aperture or apertures.

From the foregoing it will be evident that the present invention provides an improved apparatus and method for deburring apertures of a work piece although it will be obvious that various changes in detail and construction may be made without departing from the spirit and essential characteristic of the invention as defined by the scope of the appended claims.

What is claimed is:

1. In a method of deburring a conductive electro-chemically treatable work piece having an internal chamber and a plurality of substantially linearly aligned apertures in one wall defining said chamber, said apertures each expanding into an increased area volume having burrs formed around the radial edge where the aperture expands into the increased area volume; the steps of:
   securing said work piece against movement on a non-conductive support;
   electrically connecting said work piece to the positive pole of a source of DC current;
   positioning a generally cylindrical electrode rod within said work piece chamber with the cylindrical surface immediately adjacent and normal to the axis of said apertures, such that said electrode is substantially equally spaced from each of said aperture;
   securing said electrode rod against movement and electrically connecting said electrode rod to the negative pole of the source of DC current;
   flowing an electrolyte around the cylindrical surface of said electrode and through said apertures under pressure and at a velocity sufficient to cause the creation of eddy current immediately adjacent said radial edges where the apertures expand into the increased area of volume; and
   applying an electric current between the work piece and said electrode rod to electrolize said electrolyte to cause the scrubbing action of said eddy current to remove said burrs from said radial edges in said apertures.

2. In the method as defined in claim 1, the further step comprising: disposing said electrode rod relative to said aperture such that the gap distance between said electrode rod and the inner end of said aperture is from about .020 to .040 inch and the gap distance between said electrode rod and the radial edge of said aperture where said aperture expands into the increased area volume is from about .060 to about .10 inch.

3. In the method as defined in claim 1 in which said aperture opens into the atmosphere, defining said increased area volume, said eddy current being created around the outer edge of said aperture where the aperture opens into the atmosphere.

4. In the method as defined in claim 1 in which said aperture expands into an aperture of larger diameter defining said increased area volume, said eddy current being created around the radial internal edge where the aperture joins the aperture of larger diameter.

5. In the method as defined in claim 1 in which said aperture is joined by a passage internally of said work piece the junction with said aperture defining said area of increased volume, said eddy current being created around the internal radial edge at said junction.

6. A method of deburring a conductive electro-chemical workable work piece, said work piece having an internal cavity and a plurality of generally linearly aligned apertures in a wall defining said cavity, comprising the steps of:
- positioning an electrode having generally cylindrical electro conductive working face within said work piece cavity immediately adjacent said apertures;
- securing said electrode rod with the cylindrical surface normal to the axes of said apertures, substantially equally spaced from the aperture openings, and electrically connecting said electrode rod to the negative pole of a source of direct current;
- pumping an electrolyte into said work piece cavity to flow around said cylindrical surface of said electrode and through the space between the work piece and the cylindrical electrode working face;
- causing the electrolyte to flow through the apertures at a velocity sufficient to cause turbulence at the exit of said apertures; and
- applying a direct current between the work piece and the electrode working face to cause said turbulent flow of said electrolyte to electro-chemically remove burrs from around the edges of said bore in said work piece.

References Cited

UNITED STATES PATENTS

| | | | |
|---|---|---|---|
| 3,449,226 | 6/1969 | Williams | 204—143 M |
| 3,523,834 | 8/1970 | Hewins | 204—143 M |
| 3,468,775 | 9/1969 | Lanning et al. | 204—143 M |
| 3,458,424 | 7/1969 | Bender | 204—143 M |
| 3,409,524 | 11/1968 | Olson | 204—143 R |

JOHN H. MACK, Primary Examiner

R. J. FAY, Assistant Examiner

U.S. Cl. X.R.

204—224, 297 R, 129.7